S. MITCHELL.
Carriage-Hubs.

No. 154,508.  Patented Aug. 25, 1874.

Witnesses.
E. R. Scott.
Louis Spahn

Inventor.
Saml. Mitchell,
pr R. F. Osgood,
Atty.

UNITED STATES PATENT OFFICE.

SAMUEL MITCHELL, OF LIMA, NEW YORK, ASSIGNOR OF ONE-HALF HIS RIGHT TO SEYMOUR HURD, OF SAME PLACE.

IMPROVEMENT IN CARRIAGE-HUBS.

Specification forming part of Letters Patent No. 154,508, dated August 25, 1874; application filed June 20, 1874.

*To all whom it may concern:*

Be it known that I, SAMUEL MITCHELL, of Lima, in the county of Livingston and State of New York, have invented a certain new and useful Improvement in Carriage-Hubs; and I do hereby declare that the following is a full, clear, and exact description of the construction and operation of the same.

My improvement belongs to that class of wooden hubs in which the tenon ends of the spokes are held by side flanges resting on the hub and bolted or riveted through. The invention consists in making the double or branching tenons on the spokes, which fit in corresponding sockets of the hub, and in combining with the same an iron band shrunk upon the hub and resting between the tenons, thereby forming a bearing to the spokes, as hereinafter described.

Figure 1:
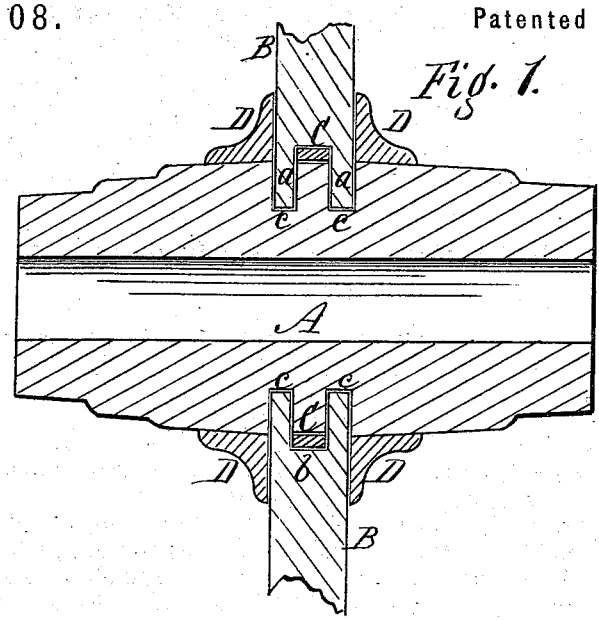
Figure 2:
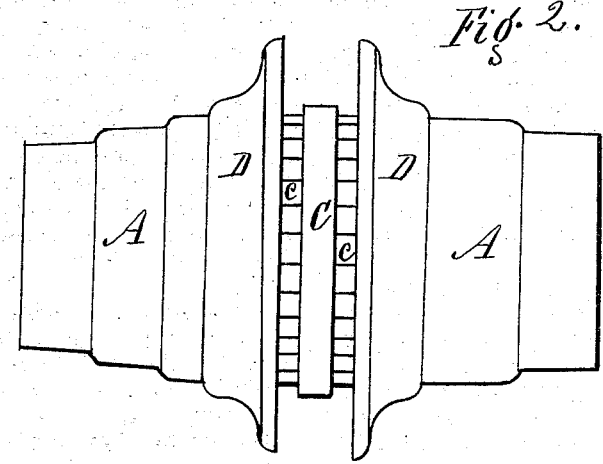
Figure 3:
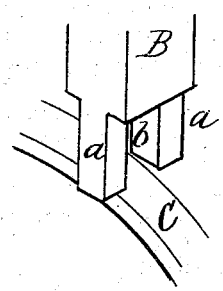

In the drawings, Figure 1 is a central vertical section. Fig. 2 is a plan of the hub. Fig. 3 is a perspective view, showing the end of one of the spokes and the band.

A represents an ordinary wooden hub, and B B the spokes. These spokes are of ordinary form, except the tenons $a$ $a$, which are made in two parts, with a central slot or opening, $b$, between, instead of being made solid, as usual. These tenons fit in corresponding double sockets $c$ $c$ of the hub, leaving a closed space between, as shown in Figs. 1 and 2. Over this closed space is shrunk an iron band, C, which braces the hub, the same being made of such width as to fit the slots $b$ of the spokes, and of a thickness such as will not yield to the end pressure of the spokes. D D are the usual metallic flanges, which rest on the hub and fit the sides of the spokes, through which they are bolted or riveted firmly together, thus making the whole wheel compact and solid.

The novel features of my invention consist in making the tenons in two parts, $a$ $a$, which fit in corresponding mortises $c$ $c$, and combining therewith the iron band C, which fits in the slots $b$ between the tenons. The double tenons make the wheel stronger, and prevent side strain or dishing by branching in both directions. The band keeps the spokes in position, and prevents the splitting of the wood between the mortises $c$ $c$. It also forms a bearing against the end pressure of the spokes, and prevents breakage of the tenons and undue wear of the wood. Furthermore, it binds the hub and obviates checking and cracking in the line of the mortises and tenons. It also prevents the wheel from becoming felly-bound.

I disclaim the construction of hub illustrated in the patent to P. B. Watson, dated April 14, 1874, as such is not my invention.

What I claim as new, and desire to secure by Letters Patent, is—

The combination of the spokes, having tenons $a$ $a$, and the hub-core having mortises $c$ $c$, with the flat metallic band C shrunk into place, and collars D D, substantially as shown and described.

In witness whereof I have hereunto signed my name in the presence of two subscribing witnesses.

SAMUEL MITCHELL.

Witnesses:
 DELOS HUTCHINS,
 J. FOREMAN.